(12) United States Patent
Banavar et al.

(10) Patent No.: US 7,783,973 B2
(45) Date of Patent: *Aug. 24, 2010

(54) CHANGE APPROVALS FOR COMPUTING SYSTEMS

(75) Inventors: Guruduth Somasekhara Banavar, Pelham Manor, NY (US); Vijay Krishnarao Naik, Pleasantville, NY (US); Biplav Srivastava, Uttar Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 744 days.

This patent is subject to a terminal disclaimer.

(21) Appl. No.: 11/567,250

(22) Filed: Dec. 6, 2006

(65) Prior Publication Data

US 2008/0140778 A1    Jun. 12, 2008

(51) Int. Cl.
*G06F 17/00* (2006.01)
(52) U.S. Cl. ............................................ 715/255
(58) Field of Classification Search .................. 715/255
See application file for complete search history.

(56) References Cited

U.S. PATENT DOCUMENTS 6,938,081 B1    8/2005 Mir
2002/0152244 A1*  10/2002 Dean et al. ................. 707/530

2005/0216327 A1    9/2005 Lee

FOREIGN PATENT DOCUMENTS

| WO | WO9849644 A1 | 11/1998 |
| WO | WO0169431 A2 | 9/2001 |
| WO | WO02088886 A2 | 11/2005 |

OTHER PUBLICATIONS

Banavar et al., IN920060014US2, U.S. Appl. No. 12/061,737, Office Action Communication, Oct. 9, 2009, 9 pages.

* cited by examiner

*Primary Examiner*—Doug Hutton
*Assistant Examiner*—Tionna Smith
(74) *Attorney, Agent, or Firm*—Gibb I.P. Law Firm, LLC

(57) ABSTRACT

Disclosed are methods, systems and computer program products for generating a change approval plan for a computing system. The computing system has at least one component and at least two user groups, and each user group has an approver. A request to change at least one said component is received. It is determined which components are affected by the change request. An initial set of approvals to be obtained from at least one of said approvers is determined based on dependencies of the affected components with other components, and based on the approvers required for each affected and dependent component. The initial set of approvals is rearranged into sub-groups such that components falling within each sub-group are dependent only upon components within a respective same group.

1 Claim, 7 Drawing Sheets

CHANGE APPROVALS FOR COMPUTING SYSTEMS

FIELD OF THE INVENTION

This invention relates to approval of changes to computing systems.

BACKGROUND

Computing systems typically are made up of several components. "Components" is intended herein in the broadest sense, and includes hardware (such as servers, network devices, and storage devices), software (such as application programs and operating systems) and middleware.

The operation of a computing system requires regular changes to be made to such components for a variety of reasons. There are many approval actors/parties involved in an approval process, and various different subsets of 'approvers' may be involved depending upon the change in question.

It is usually the case that approvals are sought from all affected parties before any changes is made to a computing system. Additionally, in complex computing systems involving a large number of components and user groups, unnecessary coordination may be required, leading to significant delays, wasted productivity and low customer satisfaction.

U.S. Pat. No. 6,938,081 (Mir, assigned to Level 3 Communications, Inc, issued Aug. 30, 2005) describes an approach where proposed changes to the infrastructure of a network are organized into different change categories based on the nature of the changes. The change category provides rules about who should be selected as affected entities, how the affected entities should be notified of the change, and the structure that should be utilized for organizing the change. A change plan is created and provided to affected entities for approval.

It would be beneficial for change approvals to be dynamically implemented, and reducing the number of approvers needed to simultaneously agree to the changes.

SUMMARY

The invention broadly determines which components (and related approver groups) are affected by a change request, and, taking into account dependencies on one another, forming sub-groups such that components in each sub-group have no dependency on components in any other group. For these groups, the respective sets of approvers are identified and the approvals sequenced.

Disclosed are a methods, computing systems, and computer program products for generating change approvals. The computing system has at least one component and at least two user groups, and each user group has an approver. A request to change at least one said component is received. It is determined which components are affected by the change request. An initial set of approvals to be obtained from at least one of said approvers is determined based on dependencies of the affected components with other components, and based on the approvers required for each affected and dependent component. The initial set of approvals is rearranged into subgroups such that components falling within each sub-group are dependent only upon components within a respective same group.

Preferably, a change time for each of the ordered approvals is allocated. The change times for each ordered approval are validated against a respective approver's availability. Furthermore, a change can be made to the computing system by executing the rearranged set of approvals at the validated change times.

BRIEF DESCRIPTION OF THE DRAWINGS

Aspects of the present invention will now be described, by way of example only, with reference to the accompanying drawings, in which.

DETAILED DESCRIPTION

Figure 1:
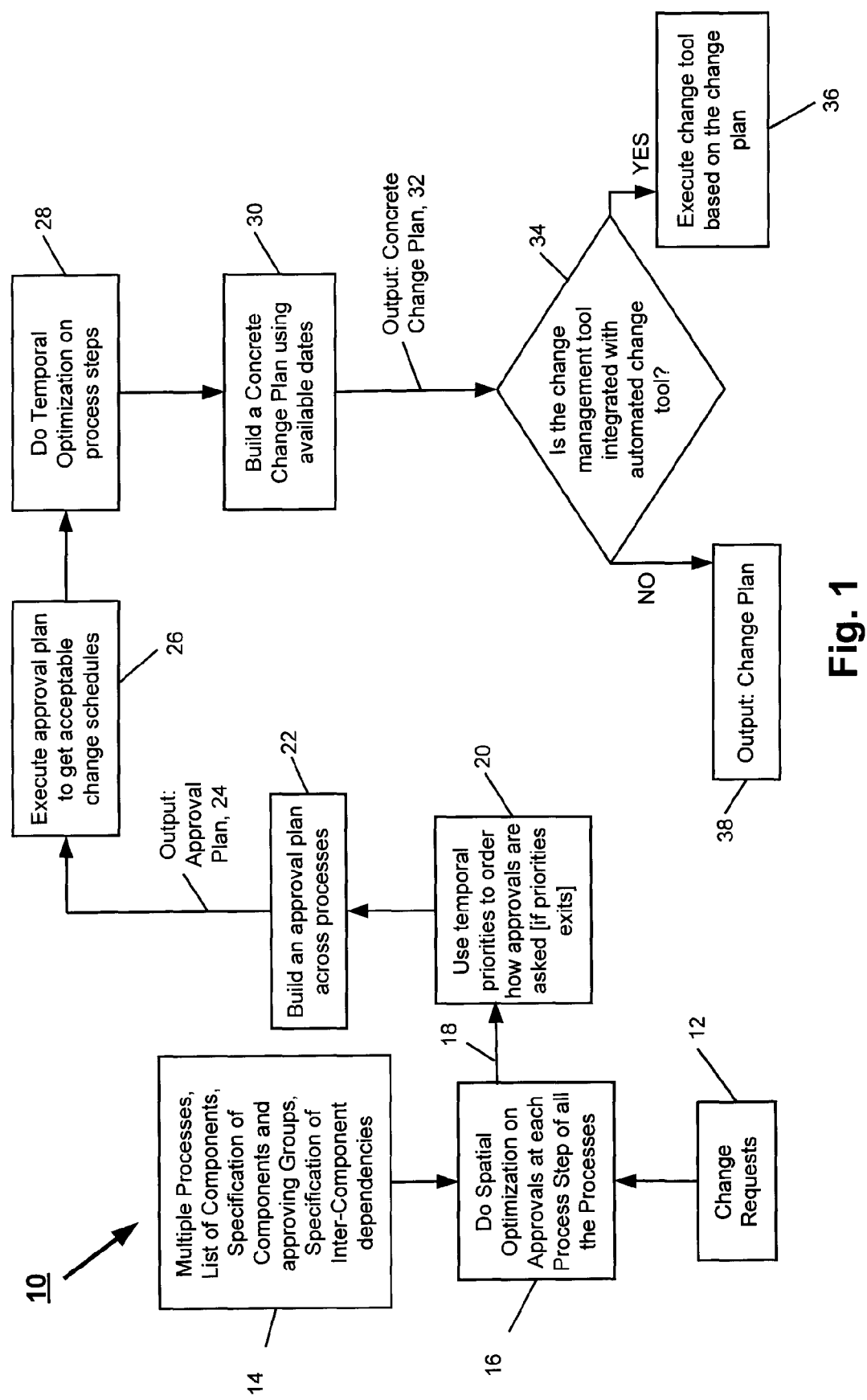
FIG. 1 is a flow diagram of a change approval process.

Where reference is made in any one or more of the accompanying drawings to steps and/or features, which have the same reference numerals, those steps and/or features have for the purposes of this description the same function(s) or operation(s), unless the contrary intention appears.

A. Overview

FIG. 1 is a flow diagram 10 of generating a change approval plan. The method 10 includes a first set of input data 12 in the form of the change approval process steps and the data items needed for each such step, and a second set of input data 14 in the form of the computer system components involved, together with their dependencies and groupings. This input data 12, 14 is provided to a process step 16 where, for each change process step, the components affected are determined, giving—by the respective component dependencies—also the approver groups affected. The necessary approvals are determined in the block 16. An initial set of approvals (i.e., of all process steps for all processes) thus is formed. A spatial optimization (re-arrangement) of the initial approvals is now performed.

The spatially optimized initial approvals 18 pass to a process step 20, where the temporal priorities are used to order how the approvals are sought from the relevant approvers.

Next, in a process step 22, an approval plan is built across the processes. The output 24 of the process step 22 is an approval plan; that is, a final sequence of approvals on a group-by-group basis.

In a process step 26, the approval plan 24 is executed to get acceptable change schedules from the approvers.

Next, in a process step 28, a temporal optimization of the process steps is performed on the basis of the acceptable change schedules.

In a process step 30, a concrete change plan 32 is built across the processes using the available dates.

The concrete change plan 32 then can be implemented by a change management tool. In the process step 34, it is determined if the change management tool is integrated with an automated change tool. If YES, then in a process step 36, the change management tool is executed on the concrete change plan 32. If NO, then in a process step 38, the concrete change plan 32 is output to an external change process.

B. Example Embodiments

Within the framework of FIG. 1, two example embodiments will now be described. The invention is to be understood as being able to be implemented for computer systems having one or more components, and for change requests having one or more change steps. The two embodiments that will be described are illustrative and not limiting in this regard.

The first embodiment applies to a single change (i.e., step) process, where each 'approval group' is responsible for a respective one of a plurality of components. The second embodiment applies to a single machine (i.e., component), with multiple change steps, and where an approver/approval group can be responsible for multiple components.

1. First Embodiment

Figure 2:
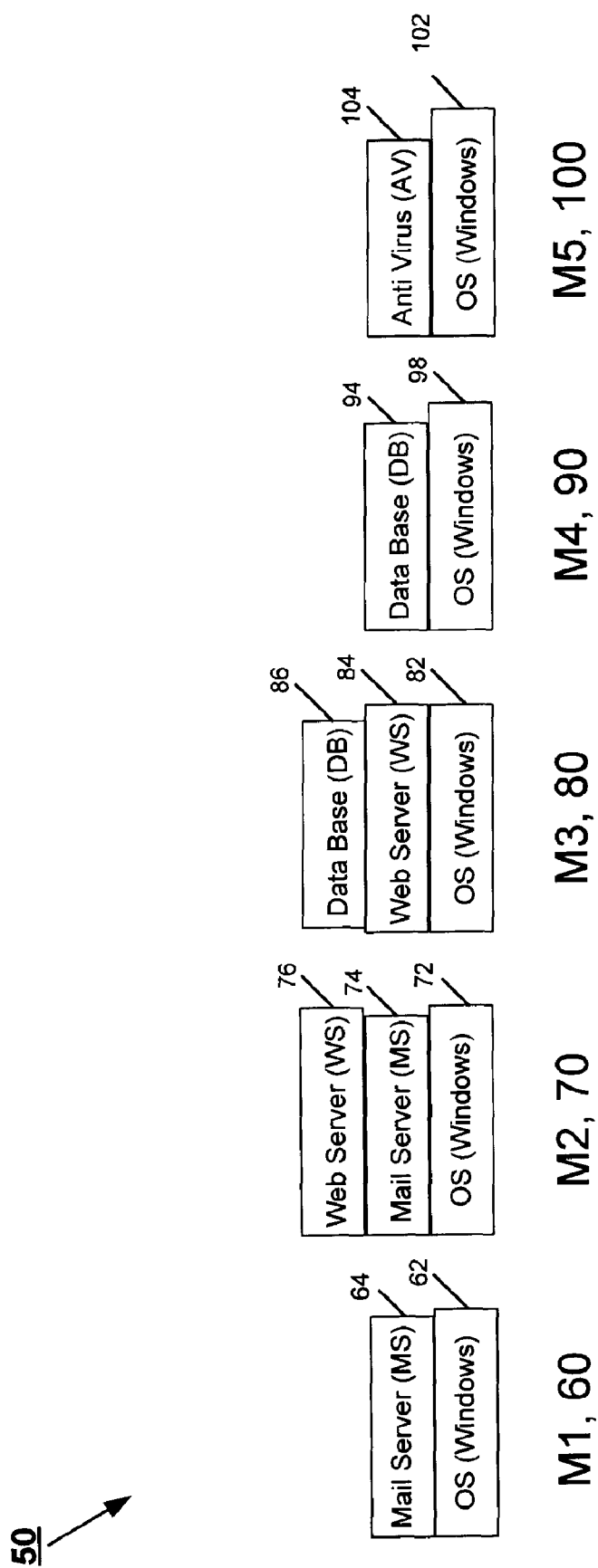
FIG. 2 is a schematic representation of a multiple machine (component) computing system.

FIG. 2 shows a computing system 50 consisting of five computers 60, 70, 80, 90, 100, designated as M1, M2, M3, M4, and M5. The machine M1, 60 includes the components of an Operating System (Windows) 62 and a Mail Server (MS) 64. The machine M2, 70 includes the components of an Operating System (Windows) 72, a Mail Server (MS) 74 and a Web Server (WS) 76. The machine M3, 80 includes the components of an Operating System (Windows) 82, a Web Server (WS) 84 and a Database (DB) 86. The machine M4, 90 includes the components of an Operating System (Windows) 92 and a Database (DB) 94. The machine M5, 100 includes the components of an Operating System (Windows) 102 and an Anti-Virus Module (AV) 104.

Some of the dependencies among the components are:
change(OS)⇒change(DB), meaning a change to the OS impacts the Database Server.
change(OS)⇒change(MS), meaning a change to the OS impacts the Mail Server.
change(OS)⇒change(WS), meaning a change to the OS impacts the Web Server.

Initial Set of Approvals

Table 1 identifies a group of approvers by both an identifier (ID), and a name. The table also indicates the individual component of the computing system 50 for which respective approver group is responsible. The change request (i.e., the block 12 in FIG. 1) is constituted by a single step process, namely "reboot machine".

TABLE 1

| ID | Name | Component responsible for |
|---|---|---|
| 1 | Security Group | AV |
| 2 | Webs Server Group | WS |
| 3 | Database Group | DB |
| 4 | Mail Server Group | MS |
| 5 | OS Group | Windows |

An Approval Request steps are as follows:

1. Parallel actions
   1) Send_Approval Request_Groups 2,3,4
   2) Send_Approval Request_Group 1
2. Receive_Approvals These steps represent the initial set of approvals of block 16 in FIG. 1.

Spatial Dependency Analysis

Figure 3:
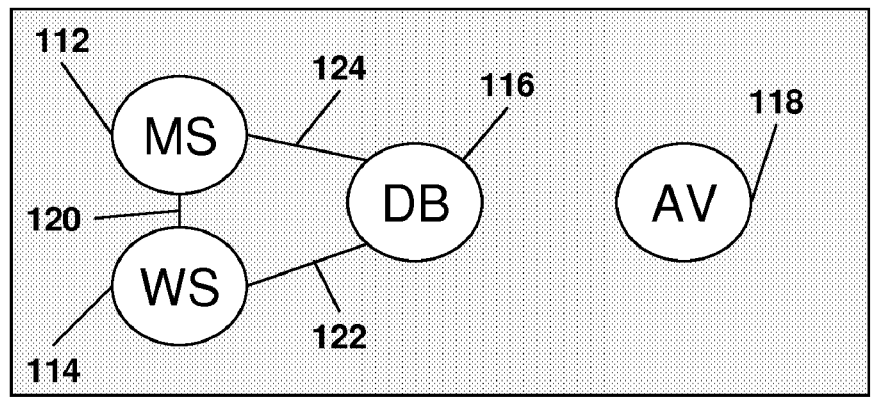
FIG. 3 is a static dependency graph.

The dependencies between the components are known and, on this basis, a static dependency graph 110 is generated, as shown in FIG. 3. Each component affected by a change is represented as a node in the graph 110. In this case, the nodes are an MS component node 112, a WS component node 114, a DB component node 116 and an AV component node 118. An edge exists between two nodes in the graph 110 if the change to the two corresponding components affects the same group of users, and hence requires approval from the same affected party. The graph 110 is then partitioned into disconnected sub-graphs. At this juncture, the approvals and changes to the components in each sub-graph can be handled independently and without any requirement of coordination between approvers. During partitioning, the connected nodes of the graph are identified and made part of a partition. Ultimately, the partitioning process may result in as many partitions as the number of connected sub-components of the graph. An example partitioning algorithm is:

Algorithm: SimplePartition( )
Input: Graph G (V, E)
Output: Set P of partitions, {Each Pi is subset of V}
  1. P = { }, TmpNodes = V, TmpSet = { }
  2. While TmpNodes is not empty
     a. v_i = Select a node from TmpNodes
     b. Add v_i to TmpSet, Remove v_i from TmpNodes
     c. Do
        For each neighbor v_j of v_i
          i. Add v_j to TmpSet
          ii. Remove v_j from TmpNodes
     d. Until no more neighbor v_j
     e. P = P U TmpSet
  3. Return P Determining Temporal Optimization If there is any priority among the groups, then the priority can be used to order the change schedule dates (i.e., step 20 in FIG. 1). In the present case, the priority of the WS group is higher than the DB and MS groups. Therefore, a temporally optimized approval request plan is as follows:

1. Parallel actions
   1. Sequential actions
      1. Send_ApprovalRequest_Groups 2
      2. Receive_approval_Group2
      3. Send_ApprovalRequest_Groups_3,4
   2. Send_Group 1
2. Receive_Approval_Group 1

Figure 4:
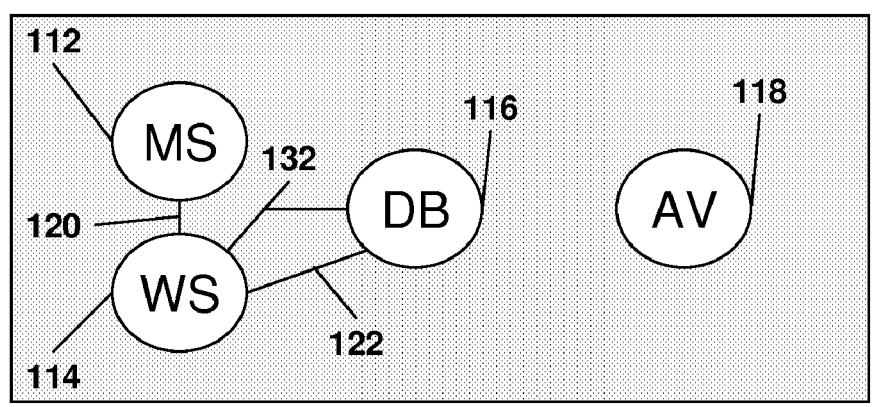
FIG. 4 is a static dependency graph.

FIG. 4 shows the spatial and temporal optimized graph 120, indicating that a replacement edge 123, existing now between the DB component node 116 and the WS component node 114.

Build Approval Plan

The approval plan is now built (i.e., step 22 in FIG. 1), in accordance with the following algorithmic steps:

1. Let A be the set of all nodes
2. Let k, the current index of the approval plan, be 0
3. While A is not empty, repeat:
   a. Add all the unsynchronized nodes Ai in A, which do not depend on any other node, to the index k of the approval plan. These are definitely parallel actions at index k.

-continued

```
    b. If some of the dependent nodes form a cycle and all of the nodes
       in the cycle depend on no other node, include all the nodes in the cycle
       at index k.
    c. Remove all such Ai from A. The remainder of nodes in A (Aj)
       depend on some node Ai at index 0.. k of the approval plan, and will
       occur later in the approval plan.
    d. Increment k.
 4. Output the approval plan of length k+1.
```

Acceptable Schedules

The different groups are sent approval requests based on the approval plan 24, and their acceptance change schedules are received in reply. Groups occurring later in the approval plan will have received the acceptance schedules of groups involved earlier in the plan, and can only return compatible dates.

The returned possible change schedules for each component are:

Possible change schedules: M1: May 27; M2: {May 20 or May 27}; M3: {May 27}; M4: {May 20}; M5: { . . . }

Machine M3 can be changed on May 20 as approver groups 2 and 3 are agreeable to it. But since group 2 is also involved with M2 and group 4, which needs to also agree for M2, wants to schedule on May 27, group 2 is agreeing for changes on May 27. M3 is being pushed to May 27.

However, if Group 2 agrees to process at different dates for different machines, the change dates become:

M1: May 27; M2: May 27; M3: {May 20}; M4: May 20; M5: May 20

The summary agreed time schedule is shown in Table 2.

TABLE 2

| ID | Name | Component responsible for | Time schedule agreeable |
|---|---|---|---|
| 1 | Security Group | AV | May 20-May 30 |
| 2 | Webs Server Group | WS | May 20-May 30 |
| 3 | Database Group | DB | May 20-May 30 |
| 4 | Mail Server Group | MS | May 27-May 30 |
| 5 | OS Group | Windows | Anytime |

Temporal Optimization

A temporal optimization is performed (i.e., step 26 in FIG. 1), according to the following algorithm:

```
// Determine consistent time to schedule each change
   Let C = All the process steps in the changes for all the machines
   Assign time to the changes based on the approver's earliest change
      schedule
   Do until there is no propagation
      If some of the change steps affect groups forming a spatial cycle,
      then their earliest change time is the consistent time among the
         groups' acceptable schedules
         If a group agrees to allow staggered change times, allow different
            times to changes that it participates in
         Propagate time to other change steps and re-assign
   Output: All the process steps in the changes for all the machines with
   consistent start time
```

This then gives a temporally optimized change plan 32:

```
1. Parallel
    1. Reboot_M1_May 20
    2. Reboot_M3_May 20
    3. Reboot_M4_May 20
    4. Reboot_M5_May 20
2. Reboot_M2_May 27
```

Concrete Change Plan

Next, the concrete change 32 plan is built, according to the following algorithm:

```
// Generate the change plan
   Let C = All the process steps in the changes for all the machines with
      their earliest start times
   Let k, the current index of the change plan, be 0
   While C is not empty
      Add all the change steps Ci in C, which can start at the same earliest
      time, to the index k of the change plan. They will be in parallel.
         Changes for all the machines that can be done at the same time get
            included in parallel
      Remove all such Ci from C. The remainder of change steps in C will
      come later
      Increment k.
Output the change plan of length k+1.
```

Runtime Implementation

Figure 5:
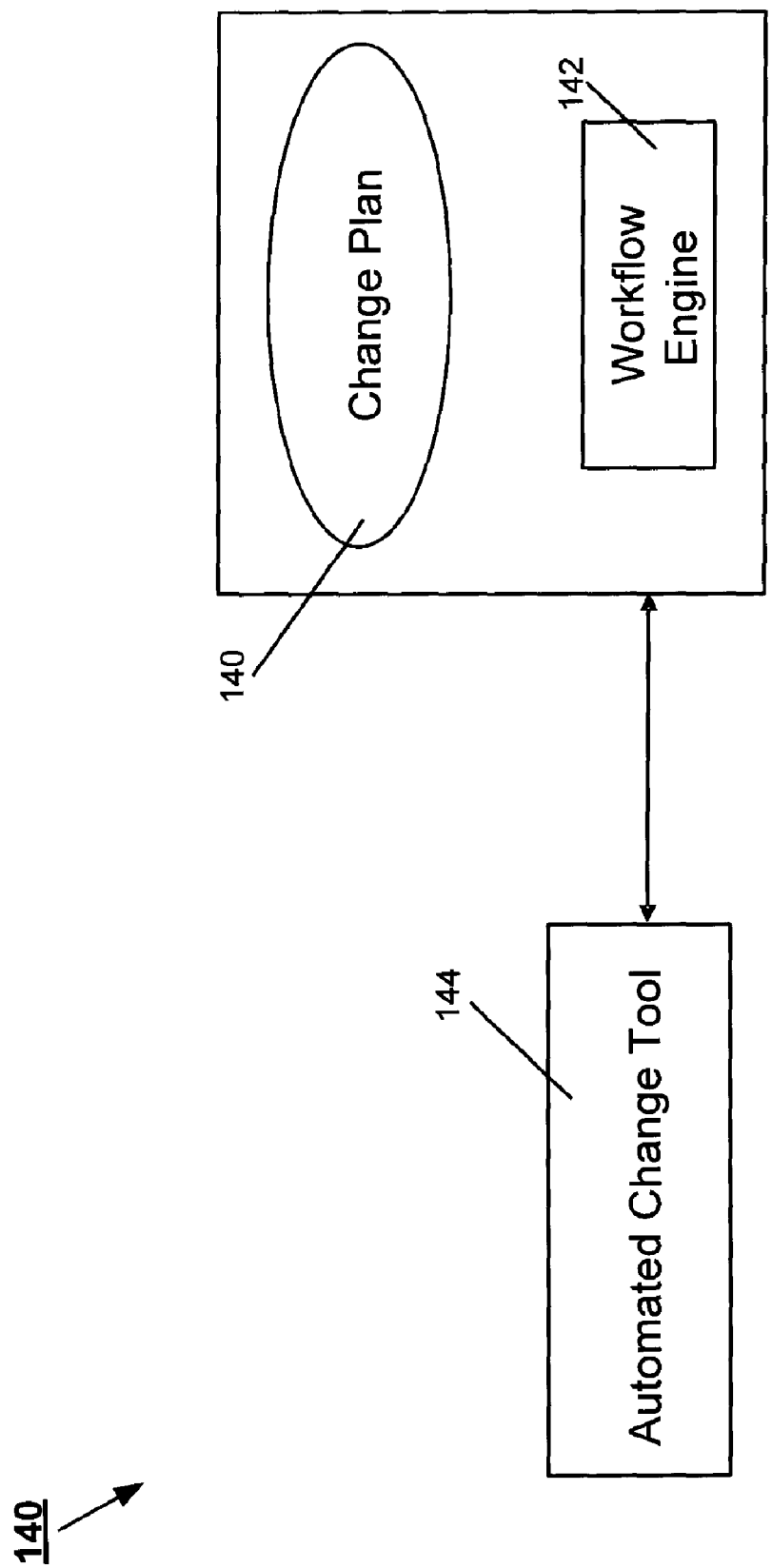
FIG. 5 is a schematic representation of a runtime implementation.

FIG. 5 shows a runtime of the change process being executed. The final change plan 140 is associated with a workflow engine 142. An automated change tool 144 (e.g., a patching tool) acts on in concert with the workflow engine 142 to execute the change plan 140 at runtime.

2. Second Embodiment

Figure 6:
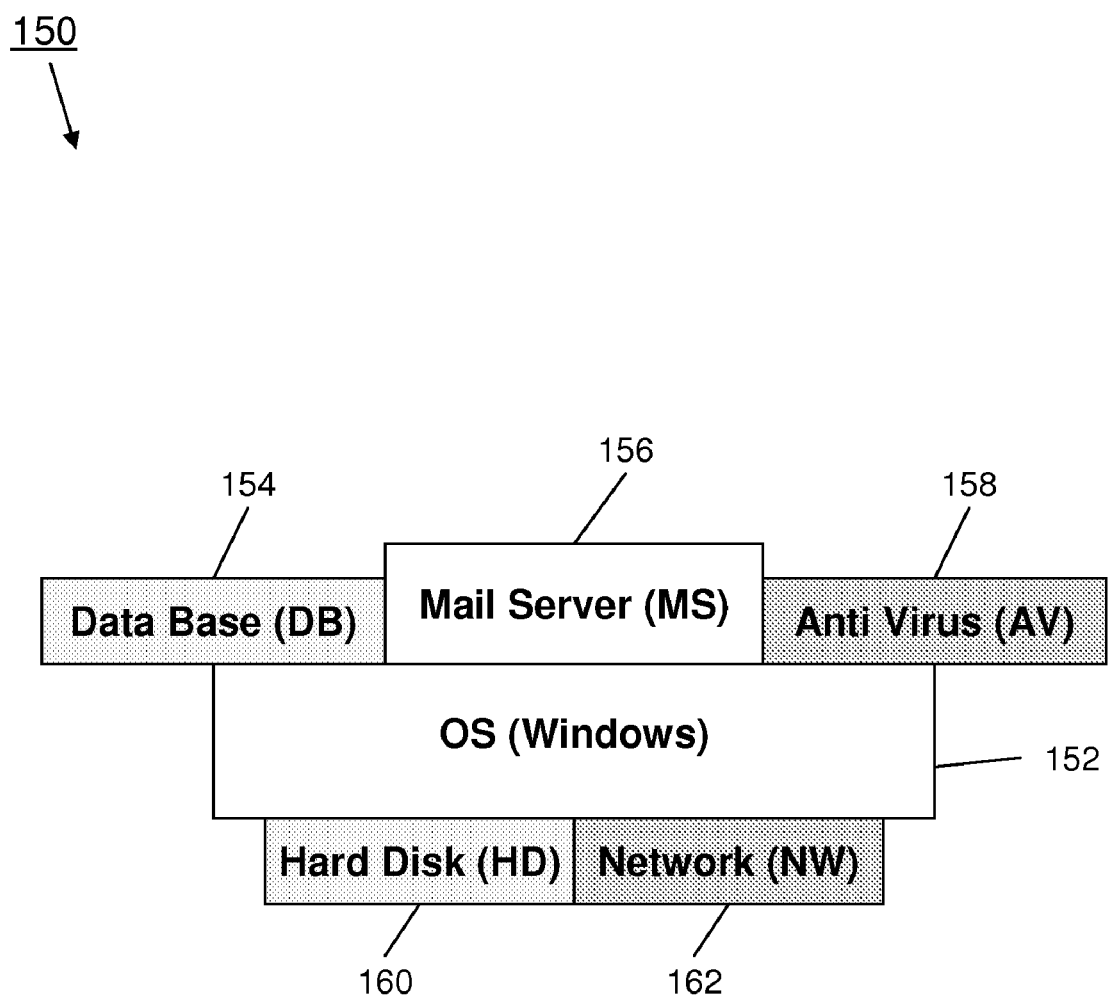
FIG. 6 is a schematic representation of a server system.

FIG. 6 shows a server 150, having a number of components, including an operating system (OS) 152 that interfaces with a database (DB) 154, a mail server (MS) 156, and an anti-virus application (AV) 158. A hard disk (HD) 160 and a network (NW) 12 also interface with the OS 152.

Some of the dependencies among the components are:
change(OS)⇒change(DB), meaning a change to the OS impacts the Database Server.
change(OS)⇒change(MS), meaning a change to the OS impacts the Mail Server.
change(NW)⇒change(OS), meaning a change to the Network impacts the OS.
change(HD)⇒change(OS), meaning a change to the Hard Disk impacts the OS.

Initial Set of Approvals

The server 150 can be represented functionally, as shown in Table 3:

TABLE 3

| Group No. | Name |
|---|---|
| 1 | Security group |
| 2 | Database group |
| 3 | Mail server group |
| 4 | OS group |
| 5 | Network group |
| 6 | Monitoring group |
| 7 | Client |

The functional groupings, representing the approvers are static, and determined based on how a computing infrastructure (in this case the server 150) is organized. The determination of which components are allocated to whichever Group is pre-determined, usually by a human actor.

Figure 7:
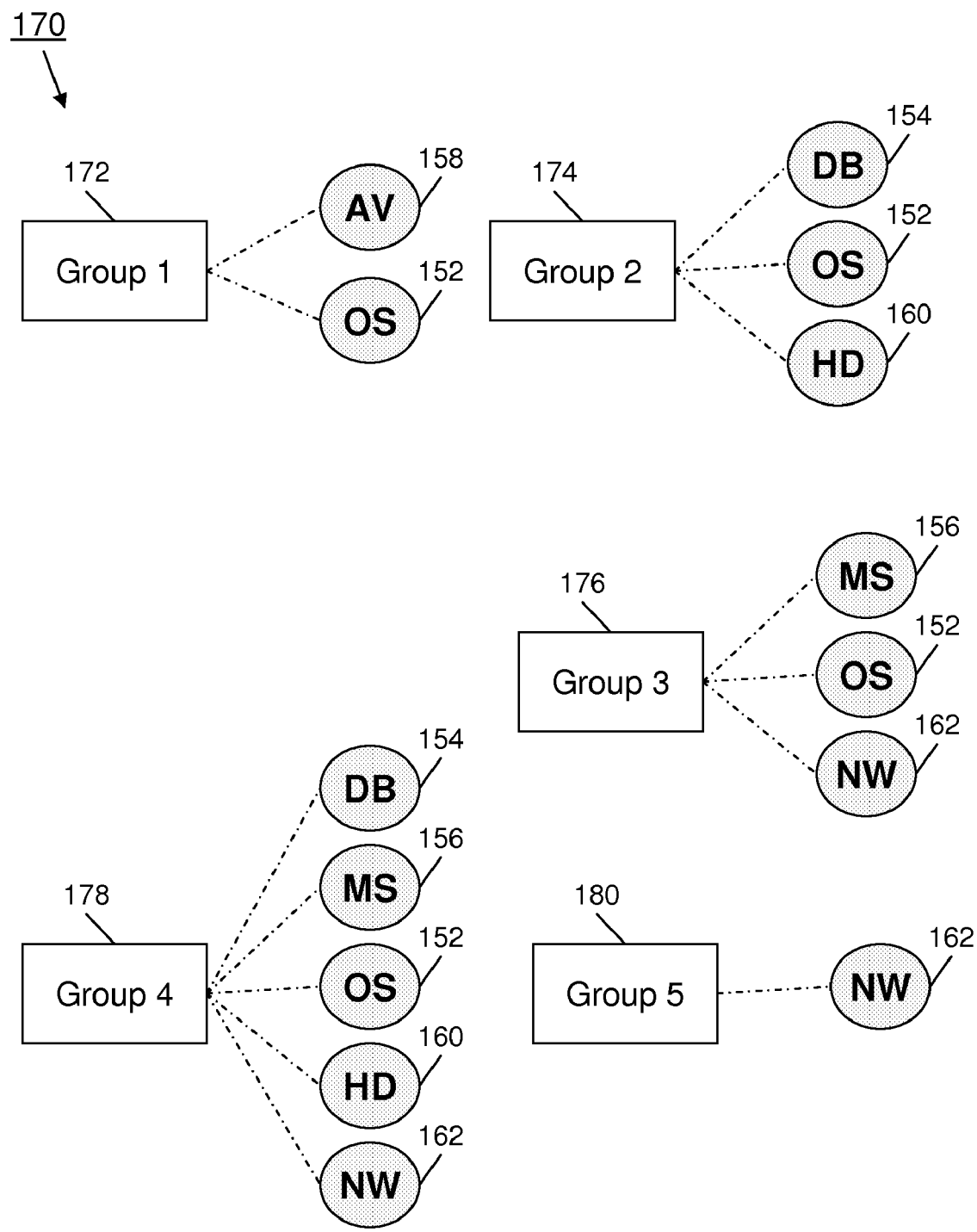
FIG. 7 is a schematic representation of a static dependency graph for the server system.

Applying these groupings to the server 150, gives a resultant static dependency graph 170 shown in FIG. 7 (representing the components 14 of FIG. 1). Group1 172 includes the components of the AV 158 and the OS 152. Group2 174 includes the DB 154, the OD 152, and the HD 160. Group3 176 includes the MS 156, the OS 152, and the NW 162. Group4 178 includes the DB 154, the MS 156, the OS 152, the HD 160, and the NW 162. Group5 includes only the NW 162. Group6 and Group7 are identical to Group4, and hence not shown.

Consider now an example change request 12 applicable to the server 150, namely the installation of anti-virus software, shown in Table 4.

TABLE 4

| Process step | Data items needed | Group No.s affected | Components affected | Approvals taken |
|---|---|---|---|---|
| (a) Create change record | Server name, anti-virus software | 4 | | |
| (b) Get approvals | | | | 1, 2, 3, 4, 5, 6, 7 |
| (c) Uninstall previous version of AV software on server | Previous version configuration | 1, 4 | AV | |
| (d) Reboot | | 1, 2, 3, 4, 5, 6, 7 | OS, HD, NW | |
| (e) Install new version of software on server | New version configuration | 1, 4 | AV | |
| (f) Reboot | | 1, 2, 3, 4, 5, 6, 7 | OS, HD, NW | |
| (g) Close change record | | 1, 4, 7 | | |

The process steps (a) to (g) and the data items needed are predetermined for the purposes of this embodiment, typically by a human actor. Because the inter-dependencies of the components, and the groups each component can affect, is known (i.e., it is a given or a predetermined relationship), then determining the components affected leads directly to the groups affected.

A change, which is an input data, can be represented by a logical formula in different ways:
  a) specify the components that it affects explicitly; e.g., change(Reboot)⇒change(OS)∧change(HD)∧change(NW)
  b) specify the components that it affects implicitly; e.g., change(Reboot)⇒∨X change(X)|Environment∋X. [Meaning: change due to reboot event affects all the components X where X is a component in the environment]. At runtime, the evaluation of the formula happens to determine the components.
  c) specify the components that the change does not affect; e.g., change(Anti-Virus-Software)∨⇒X ¬change(X)|Middleware∋X. [Meaning: change in the anti-virus software does not affect the components of the middleware].

These formulas can be processed at runtime to identify the precise affected components using the known dependencies and the corresponding affected groups (i.e. the step 16 in FIG. 1).

The 'approvals taken' values are determined as follows. The fact that approval is needed for a change will be reflected as the truth value of the term in the relevant noted logical formula. Recall that an approval is needed for any change in the server 150. An approval received for reboot step will be represented as change (Reboot) term being asserted to the value true. If change (Reboot) is false, this can be interpreted as the approval being not made (or needed).

Spatial Dependency Analysis

A spatial optimization now is performed (i.e. still within the step 16 in FIG. 1).

The concepts of graph partitioning are applied to the server 150 affected by the change to determine spatially disconnected components that are affected by a change.
  1. Each component affected by a change is represented as a node in the graph
  2. There is an edge between two nodes in the graph if the change to the two corresponding components affects the same group of users and hence requires approval from the same affected party
  3. The graph is partitioned into disconnected sub-graphs.

Figure 8:
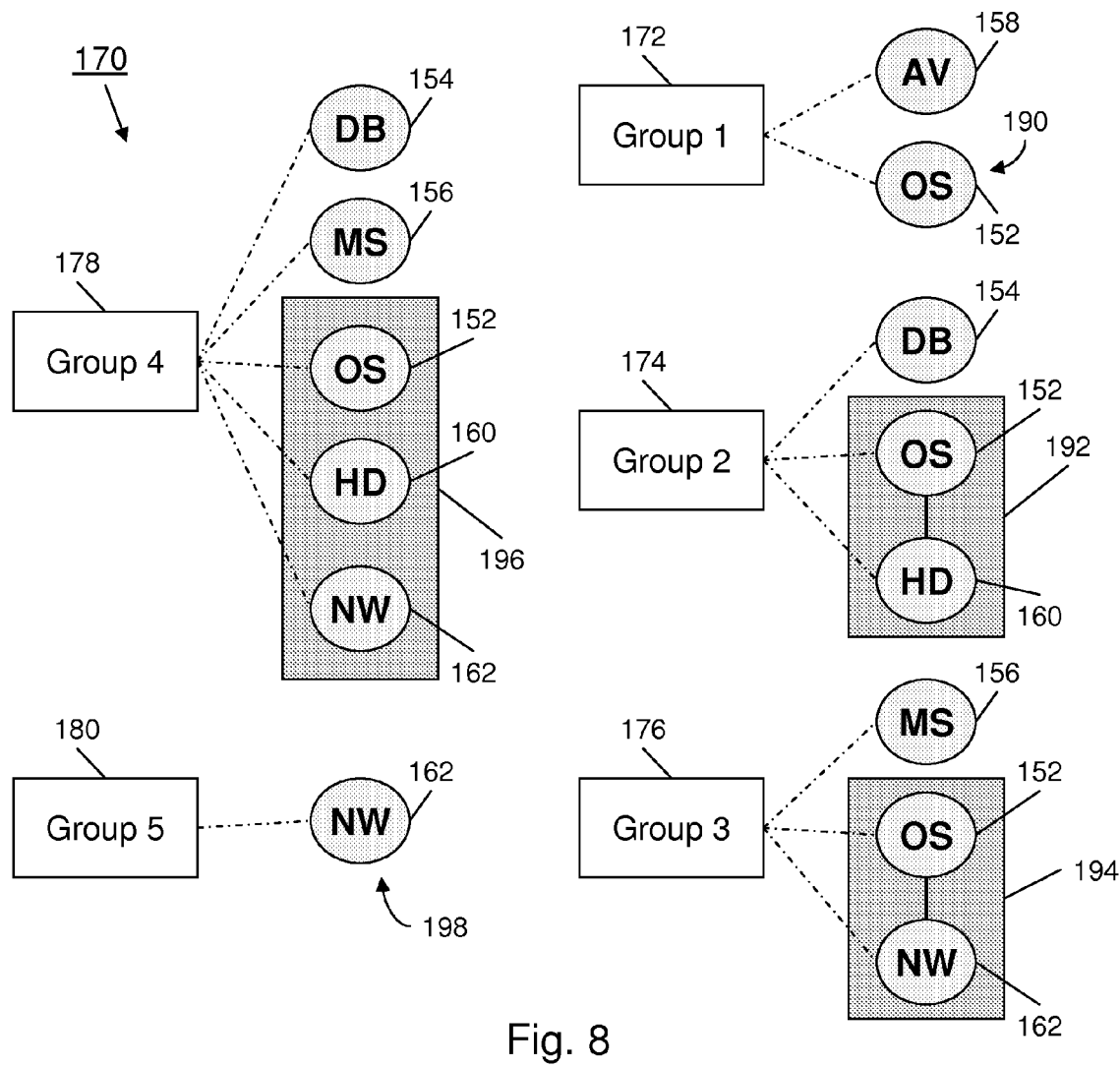
FIG. 8 is a schematic representation of the static dependency graph of FIG. 9 showing edges between components according to a given change request.

In the present embodiment, from the static dependency graph 170, and using Table 4, the components within each Group Number that are affected by each of the process steps are identified, and are edge-connected to form disconnected sub-graphs. Taking step (d) as an example, and referring to FIG. 8, the sub-graphs become: for Group1, the sub-graph 190 formed by the OS 152 only; for Group2, the sub-graph 192 formed by the OS 152 and the HD 160; for Group3, the sub-graph 194 formed by the OS 152 and the NW 162; for Group4, the sub-graph 196 formed by the OS 152, the HD 160, and the NW 162; and for Group5, the sub-graph 198 formed by the NW 162 only. The sub-graphs for Group6 and Group7 are the same as for Group4, and thus not shown. The affected components are considered to have an edge between them, representing that a change process step required an approval from all such edge-connected components.

Once the sub-graphs are found for each change approval process step, then such approvals for changes to the components in each sub-graph may be handled independently and asynchronously.

Figure 9:
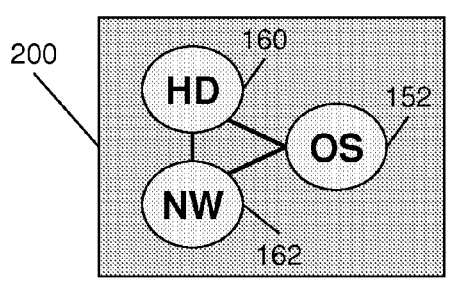
FIG. 9 is a schematic representation of a dynamic spatial graph for the given change request.

FIG. 9 shows a resultant dynamic spatial graph 200 based on the change for step (d), which is the merging of the six shaded sub-graphs (i.e. within Group2, Group3, Group4, Group5, Group6, and Group7). The graph has the OS 152, the HD 160 and the NW 162 interconnected. In other words, the spatial analysis has determined that only approvals of the OS 152, the HD 160, and the NW 162 are needed to be obtained together.

Determining Temporal Optimization

Now that the spatial dependencies have been determined for each change process step, a further optimization can be achieved by determining temporal dependencies (i.e., the step 20 in FIG. 1). In terms of the present example, the initial approvals occurring at process step (c) are optimized or reordered.

A temporal analysis is performed using the following steps:

1. the approvers are identified for each atomic change.
2. a temporal dependency exists between two change steps if both of them cannot be executed simultaneously as one needs the output of another, or is co-located on the same machine.
3. if there are no temporal dependencies among some of the atomic steps, then their approvals and changes can be performed asynchronously.
4. if there are dependencies among the atomic change steps, then the approvals and changes to a component or to a set of components can be suitably pipelined.

Now, remove these approval steps from consideration and repeat the process until no more approval steps left to consider (step 3c).

1. let A be the set of all approval steps
2. let k, the current index of the approval plan, be 0
3. while A is not empty
   a. add all the unsynchronized approval steps Ai in A, that do not depend on any other approval step, to the index k of the approval plan
   b. during an approval step Ai, let the approver approve all the incremental changes that are spatially connected.
   c. remove all such Ai from A. The remainder of approvals steps in A (Aj) depend on some approval step Ai at index 0 . . . k of the approval plan.
   d. increment k.
4. output the approval plan of length k + 1.

In the output approval plan, an approval step is only dependent on the approval steps that have a lower index in the

TABLE 5

| Process step | Data items needed | Group No.s affected | Components affected | Approvals taken |
|---|---|---|---|---|
| (a) Create change record | Server name, anti-virus software | 4 | | |
| (b) Get approvals | | | | |
| (c) Uninstall previous version of AV software on server | Previous version configuration | 1, 4 | AV | 1 |
| (d) Reboot | | 1, 2, 3, 4, 5, 6, 7 | OS, HD, NW | 2, 3, 4, 5, 6, 7 |
| (e) Install new version of software on server | New version configuration | 1, 4 | AV | |
| (f) Reboot | | 1, 2, 3, 4, 5, 6, 7 | OS, HD, NW | |
| (g) Close change record | | 1, 4, 7 | | |

As illustrated in Table 5, the temporal analysis identifies that approval of AV is needed at step (c) while approvals of other groups are not needed until step (d). Both of these analyses are merged to identify who (i.e. which Group) will approve, and when (logically), as shown in FIG. 9. The result shows that approval by Group1 172 should be performed first, followed by an approval for the remaining groups can be done independently and asynchronously. In this sense, the optimized ordering of approvals is now known.

Build Approval Plan

The temporal optimization gives the necessary ordering of approvals, but not the timing. An approval plan must therefore be built (i.e., step 22 in FIG. 1).

To introduce the terminology used below: by an approval step, is meant a step i where approval of a group j is needed; for each step i and for each approver group j, an approval step is created. In the algorithm below, the following insight is used in generating the approval plan. First, put approval steps that are not (temporally) dependent on any other approval steps to occur before it (step 3a). For each of these approvals, identify all the approvals that the approver has to also do (spatial dependency) and aggregate the approvals (step 3b).

approval plan, and when an approval is asked, it is asked for all the changes in the process steps in a single instance.

The approval plan 24 is:
1. Uninstall_Grp1_M
2. Parallel
   I. Reboot_Grp2_M
   II. Reboot_Grp3_M
   III. Reboot_Grp4_M
   IV. Reboot_Grp5_M
   V. Reboot_Grp6_M
   VI. Reboot_Grp7_M Optimized Approval Plan The approval plan is now optimized (i.e., the steps 26, 28 and 30 in FIG. 1) according to the following algorithm:
a) static setup: have a calendar per managed component
   i. at a suitable level of resource granularity (server collection v/s server v/s partition instance)
   ii. multiple calendars may be needed as well—e.g., for change scheduling, for execution scheduling, etc. However, a single calendar is suitable for most purposes.
b) static setup: have a calendar for each approval group
c) dynamic processing:

a. use the approver's calendar, to determine time when to send notification for approval
b. provide information about the change target's (managed resource's) calendar to the approver to assist in approval.

Table 6 illustrates the calendar of the components with the following time slots that are available for changes.

TABLE 6

| Id. | Machine Name | Available slots |
| --- | --- | --- |
| 1 | M1 | [Time1, Duration1], [Time2, Duration2] . . . |
| 2 | M2 | [Time1, Duration1], [Time2, Duration2] . . . |
| . . . | | |

And Table 7 illustrates the calendar of the approval groups with the following time slots.

TABLE 7

| Group No. | Name | Available slots |
| --- | --- | --- |
| 1 | Security group | [Time1, Duration1], [Time2, Duration2] . . . |
| 2 | Database group | [Time1, Duration1], [Time2, Duration2] . . . |
| 3 | Mail server group | [Time1, Duration1], [Time2, Duration2] . . . |
| 4 | OS group | [Time1, Duration1], [Time2, Duration2] . . . |
| 5 | Network group | [Time1, Duration1], [Time2, Duration2] . . . |
| 6 | Monitoring group | [Time1, Duration1], [Time2, Duration2] . . . |
| 7 | Client | [Time1, Duration1], [Time2, Duration2] . . . |

The concrete approval plan 32 can be generated by using the first time slot available for the machines and the approval groups to build the concrete approval plan. Other standard scheduling algorithms also can be utilized.

Automated Execution of Optimized Plan

The concrete change plan 32 is represented in the BPEL workflow language, and the change (e.g., software installation) is performed using an automated tool. The concrete change plan is then run using a workflow execution tool, and ensures that the change management tool gets the right approval as it is performing the changes. An illustration of this integration is given in Table 8.

TABLE 8

| Time | Automated Process Steps in a change execution tool: | Approval Plan in a workflow representation: |
| --- | --- | --- |
| T1 | | Send_approvalRequest_Group 1, 2, 3, 4, 5, 6, 7 |
| T1 | | Receive_approval _Group 1 |
| T2 | Uninstall previous version of AV software on server | |
| T3 | | Receive_approval_Group 1, 2, 3, 4, 5, 6, 7 |
| T4 | Reboot | |
| T5 | Install new version of software on server | |
| T6 | Reboot | |

At this juncture, the change process and the approval processing have been integrated.

The concrete change plan of Table 8 is executable and can be run in the order illustrated.

Multiple Change Approvals

Consider now the situation where there are two or more spatially optimized approvals. Taking the 'anti-virus' example illustrated in Table 5, and a second 'patch' example presented in Table 9 as follows:

TABLE 9

| Process steps | Groups affected | Components affected | Approvals |
| --- | --- | --- | --- |
| (a) create change record | 4 | | |
| (b) get approvals | | | |
| (c) install patch | 4 | | |
| (d) reboot | 1, 2, 3, 4, 5, 6, 7 | OS, HW, NW | 1, 2, 3, 4, 5, 6, 7 |
| (e) close change record | 1, 4, 7 | | |

The temporal optimization can be performed on both sets of approvals in a merged form, by collecting all the process steps of the multiple processes together and removing the redundant steps. Specifically, such an optimization is illustrated below:

1. inputs: A set with k processes to be merged be I[1], . . . I[k]
2. let P* be the merged process
3. P* = I[1]
4. for each of the remainder processes I[2] . . . I[k]
    for each step in the process,
        if P* does not have that step,
            include it in P* at the first step possible
5. output P*

The resultant temporally optimized approvals schedule is shown in Table 10, where approvals for 2, 3, 4, 5, 6, and 7 can be merged, that 1 can be done before the others, and that after 1 is performed, approvals can be obtained for both the anti-virus and patch changes at the same time.

TABLE 10

| Process steps | Groups affected | Components affected | Approvals |
| --- | --- | --- | --- |
| (a) create change record | 4 | | |
| (b) get approvals | | | |
| (c1) uninstall previous version of software on server | 1, 4 | AV | |
| (c2) install patch | 4 | | |
| (d) reboot | 1, 2, 3, 4, 5, 6, 7 | OS, HW, NW | 2, 3, 4, 5, 6, 7 |
| (e) install new software on server | 1, 4 | AV | |
| (f) reboot | 1, 2, 3, 4, 5, 6, 7 | OS, HW, NW | |
| (g) close change record | 1, 4, 7 | | |

The approval plan building (steps 20 and 22) and optimization (steps 26, 28, 30) then occur as discussed previously.

C. Further Embodiments

Although the invention has been described in what is conceived to be the most practical and preferred embodiments and have been for the purpose of illustration, it should be understood that other similar embodiments fall within the scope of this invention. For example, this invention may equally be deployed in any of a client/server application environment; a distributed software application environment; or in a stand-alone application environment.

As discussed above in the example embodiment, the spatial partitioning provides gross decoupling of the approvals and change while the decomposition of change into atomic change units provides further temporal pipelining of approval and change within a connected sub-graph. As a part of this embodiment, the spatial and temporal analysis is made after a change request is received and evaluated on the affected environment to determine the decoupling and pipelining.

A further embodiment is to dynamically assemble the approvals as they arrive and create larger aggregate work units which, in some cases, may be more efficient to deliver. A further embodiment optimizes triggering of approval requests by using look-ahead, greedy, and pre-approval techniques.

CONCLUSION

Various alterations and modifications can be made to the techniques and arrangements described herein not departing from the scope of this invention, and such altercations and modifications would be apparent to a person skilled in the relevant art.

We claim:

1. A computer-implemented method for generating a change approval plan for a computing system, said computing system having at least one component and at least two user groups, and each said user group having an approver, the method comprising:

receiving, by a computing device, a request to change said at least one said component;

determining, by said computing device, components affected by said request to change;

determining, by said computing device, an initial set of approvals to be obtained from at least one of said approvers based on dependencies of said components affected by said request to change with other components, and based on the approvers required for each said affected and dependent component; and rearranging, by said computing device, said initial set of approvals into sub-groups such that components falling within each said sub-group are dependent only upon components within a respective same user group, wherein said rearranging said initial set of approvals further comprises:

representing, by said computing device, said components affected by said request to change as a static dependency graph wherein each component is a node in said graph, and an edge exists between two nodes if said request to change to the respective components affects the same user group; and partitioning, by said computing device, said graph at locations in said graph where no edge exists between components to form disconnected sub-graphs, to provide said sub-groups;

ordering, by said computing device, said approvals in accordance with a priority within said user groups, wherein said priority is determined according to an order of sequential steps of said request to change relative to said approvals;

identifying, by said computing device, an approver for each said sub-group and requesting, by said computing device, approval of each said approver identified for each of said sub-groups corresponding to said initial set of approvals rearranged into said sub-groups;

allocating, by said computing device, a change time for each of said ordered approvals; and validating, by said computing device, said change times for each said ordered approval against a respective approver's availability.

* * * * *